United States Patent [19]
Okazaki et al.

[11] 4,167,294
[45] Sep. 11, 1979

[54] APPARATUS FOR MOUNTING A HUB CAP TO A WHEEL

[75] Inventors: Hiroshi Okazaki, Kariya; Toshio Suzuki, Okazaki; Takeo Kondo; Nobuo Hiraiwa, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 877,668

[22] Filed: Feb. 14, 1978

Related U.S. Application Data

[63] Continuation of Ser. No. 705,887, Jul. 16, 1976, abandoned.

[30] Foreign Application Priority Data

Aug. 7, 1975 [JP] Japan .............................. 50-109367

[51] Int. Cl.² ............................................. B60B 27/00
[52] U.S. Cl. ................................ 301/108 R; 220/319; 24/73 HC
[58] Field of Search ............. 301/108 R, 108 A, 37 R, 301/37 TP, 37 PB; 220/320, 326, 319; 24/73 HC, 216, 217

[56] References Cited

U.S. PATENT DOCUMENTS

| 2,098,205 | 11/1937 | Eksergian | 24/73 HC |
| 2,193,105 | 3/1940 | Lyon | 301/37 TP |
| 2,740,502 | 4/1956 | Butterfield | 301/37 R |

Primary Examiner—Robert J. Spar
Assistant Examiner—H. Grant Skaggs
Attorney, Agent, or Firm—Stevens, Davis, Miller & Mosher

[57] ABSTRACT

An attachment for a cup shaped ornamental hub cap comprises a resilient clip ring assembled with the hub cap. The clip ring comprises an annular dish spring part clamped to the open inner-end of the hub cap to be axially tiltable and a plurality of spring legs extending radially and inwardly from the inner peripheral edge of the dish spring part adapted to engage with an annular recess on a cylindrical flange of a wheel body, whereby in attaching the hub cap onto the cylindrical flange of the wheel body, the spring legs of the clip are resiliently engaged with the annular recess due to tilting movement of the dish spring part.

4 Claims, 6 Drawing Figures

APPARATUS FOR MOUNTING A HUB CAP TO A WHEEL

This is a continuation of application Ser. No. 705,887 filed July 16, 1976 and now abandoned.

BACKGROUND OF THE INVENTION

The present invention relates to hub cap assemblies for vehicle wheels, and more particularly to an improvement of means for detachably mounting a cup shaped ornamental hub cap onto the central portion of a wheel body to conceal the outer end of a wheel axle.

SUMMARY OF THE INVENTION

It is an object of the present invention to provide an improved hub cap attachment by which a cup shaped ornamental hub cap is easily and securely mounted at its open end onto a cylindrical flange protruded from the central portion of a wheel body.

It is another object of the present invention to provide an improved hub cap attachment which has a simple construction and is designed to be suitable for mass-production.

According to the present invention, there is provided means for mounting a cup shaped ornamental hub cap onto a cylindrical flange protruded from the central portion of a wheel body, which comprises a resilient clip ring having an annular dish spring part clamped to the open inner-end of the hub cap to be axially tiltable and a plurality of spring legs extending radially and inwardly from the inner peripheral edge of the dish spring part adapted to engage with an annular recess on the cylindrical flange, whereby in attaching the hub cap onto the cylindrical flange of the wheel body, the spring legs of the clip are resiliently engaged with the annular recess due to tilting movement of the dish spring part.

BRIEF DESCRIPTION OF THE DRAWINGS

Other objects, features and advantages of the present invention will be readily apparent from the following detailed description of certain preferred embodiments thereof taken in conjunction with the accompanying drawings, in which.

DESCRIPTION OF THE PREFERRED EMBODIMENTS

Figure 1:
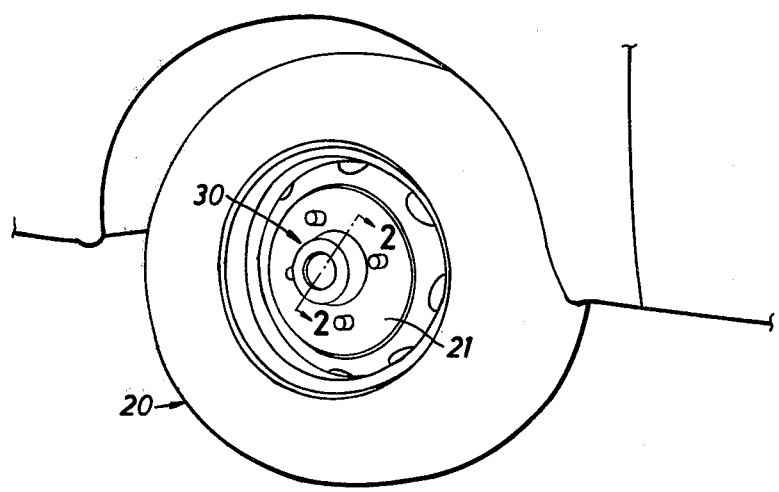
FIG. 1 illustrates a hub cap assembly for a rear wheel drive vehicle in accordance with the present invention.
Figure 2:
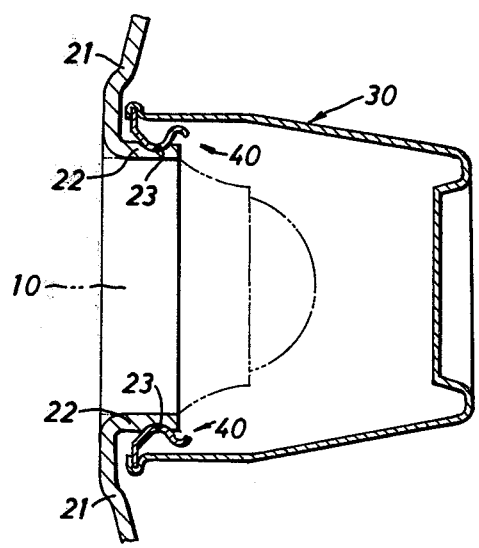
FIG. 2 illustrates an enlarged transverse cross-section taken along line 2—2 of FIG. 1.

Referring now to the drawings, particularly in FIG. 1, there is illustrated an ornamental hub cap 30 attached onto the central portion of a wheel body 21 which is securely mounted on a front road wheel 20 of a rear wheel drive vehicle. The wheel body 21 is provided at the central portion thereof with a cylindrical flange 22 to be coupled with a front axle hub 10, as shown in FIG. 2. (At a rear road wheel, the cylindrical flange 22 is to be coupled with a rear axle shaft.) The cylindrical flange 22 of the wheel body 21 is provided with a pressed annular recess 23 which is formed by pressing process to have a trapezoid cross-section. The ornamental hub cap 30 is also formed by pressing process into a cup shape and has provided at the open inner-end thereof an annular resilient clip 40.

Figure 3:
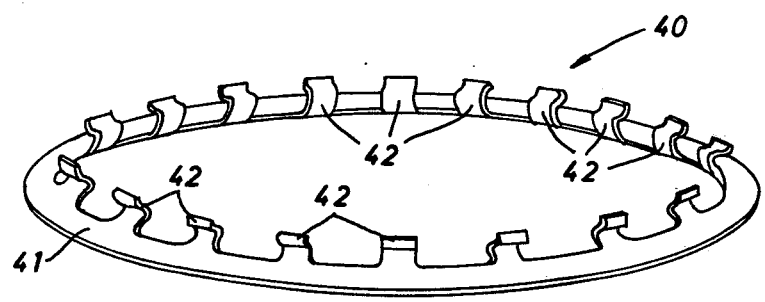
FIG. 3 is a perspective view of a resilient clip ring assembled with the hub cap shown in FIG. 2.
Figure 4A:
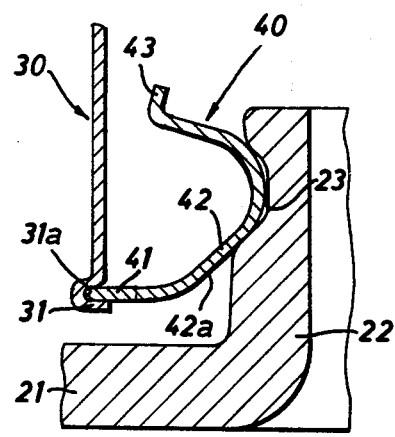
FIGS. 4A and 4B illustrate attaching process of the hub cap assembly of FIG. 2.

As clearly shown in FIG. 3, the resilient clip ring 40 is made of a resilient sheet metal by a pressing process and comprises an annular dish spring part 41 and a plurality of spring legs 42 extended radially inwardly from the inner peripheral edge of the dish spring part 41. Each leg 42 is upturned at its tip 43. In assembling the clip ring 40 with the ornamental hub cap, as showing in FIG. 4A, the outer periphery of the dish spring part 41 is engaged and clamped with an annular groove 31a formed by an annular rim flange 31 which is inwardly curved at the open end of the hub cap 30. In this assembly, the dish spring part 41 of the clip ring 40 is axially inwardly tiltable only toward the inside of the hub cap 30 by adjustment of caulking of the annular rim flange 31. Furthermore the dish spring part 41 is slightly movable radially.

To attach the hub cap assembly 30 onto the wheel body 21, firstly the spring legs 42 of the clip 40 are engaged at their tapered faces 42a with the outer end of the cylindrical flange 22 located at the central portion of the wheel body 21. Then, the ornamental hub cap 30 is forcibly pushed toward the wheel body 21 to engage the spring legs 42 within the annular recess 23 due to tilting movement of the dish spring part 41 of the clip 40. This completes the firm mounting of the hub cap 30 onto the wheel body 21. Thus, a grease cap at the outer end of the axle hub 10 (or the outer end of the rear axle shaft) is concealed by the hub cap 30 which decorates the central portion of the wheel body 21.

Figure 4B:
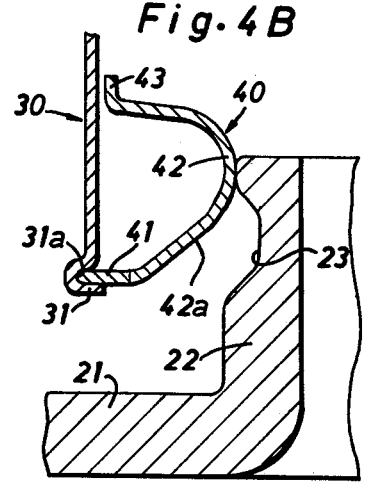

In this attaching process, the spring legs 42 of the clip 40 are pressed radially outwardly by engagement with an annular shoulder between the annular recess 23 and the end face of the cylindrical flange 22 and simultaneously the dish spring part 41 is axially inwardly tilted, as shown in FIG. 4B. As a result, the spring legs 42 of the clip 40 are resiliently engaged within the annular recess 23 of the cylindrical flange 22 so that the hub cap 30 is firmly mounted onto the central portion of the wheel body 21 by means of returning force of the spring legs 42 and reaction force of the dish spring part 41. Furthermore, in this attaching process, even if the hub cap 30 is pushed toward the wheel body 21 in an inclined state, the spring legs 42 of the clip 40 are easily coupled within the annular recess 23 of the cylindrical flange 22 due to the centering imparted by tilting movement of the dish spring part 41 of the clip 40.

Figure 5:
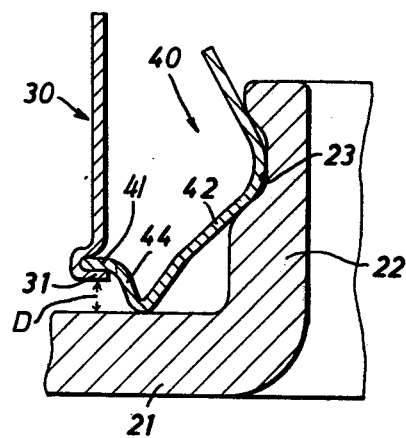
FIG. 5 illustrates attaching process of a modification of the hub cap assembly of FIG. 2.

In FIG. 5, there is illustrated a modification of the hub cap assembly mentioned above, wherein each of the spring legs 42 of the clip 40 is provided with an out-curved portion 44 to be engaged with the outer surface of the wheel body 21. With this modification, the attachment of the hub cap 30 to the wheel body 21 can be confirmed by engagement of the outcurved portion 44 with the outer surface of the wheel body 21, the attached hub cap 30 can easily be removed by a tool inserted into a clearance D between the rim flange 31 of the hub cap 30 and the outer surface of the wheel body, and, further, the effective length of the respective spring leg 42 becomes large.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A combination of a cup shaped ornamental hub cap and an apparatus for mounting said hub cap onto a cylindrical flange protruding from the central portion of a wheel body to conceal the outer end of a wheel axle, the hub cap having an open end, a closed end, and sides extending from said closed end and terminating at said open end, the apparatus comprising:

a resilient clip ring having an annular shaped dish spring portion clamped to said open end of said hub cap, said dish spring portion being extended radially inwardly and tiltable at the clamped portion thereof in an axial direction of said wheel axle toward the interior of said hub cap, said dish spring portion having a plurality of spring legs extending radially inwardly from the inner peripheral edge of said dish spring portion towards said closed end of said hub cap which are adapted to engage with an annular recess on said cylindrical flange, said spring legs being resiliently engageable with said annular recess due to tilting movement of said dish spring portion toward the interior of said hub cap to hold said hub cap to said wheel body when engaged therewith.

2. The combination as claimed in claim 1, wherein each of said spring legs has an outcurved portion which engages with the outer surface of said wheel body to form an annular clearance between said open end of said hub cap and said wheel body.

3. The combination as claimed in claim 1, wherein each of said legs is upturned at its tip and adapted to engage with the inner wall of said hub cap during hub cap application.

4. The combination as claimed in claim 1, wherein said resilient clip ring is made of a pressed resilient sheet metal.

* * * * *